(12) United States Patent
Morita et al.

(10) Patent No.: US 7,820,777 B2
(45) Date of Patent: Oct. 26, 2010

(54) COMPOSITION, FILM AND PRODUCING METHOD THEREFOR

(75) Inventors: Kensuke Morita, Shizuoka (JP); Koji Wariishi, Shizuoka (JP); Kazutaka Takahashi, Shizuoka (JP); Makoto Muramatsu, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 1024 days.

(21) Appl. No.: 11/515,014

(22) Filed: Sep. 5, 2006

(65) Prior Publication Data

US 2007/0054135 A1    Mar. 8, 2007

(30) Foreign Application Priority Data

Sep. 5, 2005 (JP) .......................... P.2005-256513
Feb. 24, 2006 (JP) .......................... P.2006-048811
Mar. 20, 2006 (JP) .......................... P.2006-077437

(51) Int. Cl.
*C08G 77/442* (2006.01)
*B32B 9/04* (2006.01)
*H01L 21/31* (2006.01)
*H01L 21/469* (2006.01)

(52) U.S. Cl. .......................... 528/32; 438/778; 438/779; 438/780; 438/781; 428/447

(58) Field of Classification Search .................. 428/447, 428/446; 438/99, 778–780; 528/37, 32–33
See application file for complete search history.

(56) References Cited

U.S. PATENT DOCUMENTS

| | | | | |
|---|---|---|---|---|
| 6,171,770 | B1 * | 1/2001 | Chen et al. .................. | 430/531 |
| 2002/0192980 | A1 * | 12/2002 | Hogle et al. ................. | 438/778 |
| 2005/0131190 | A1 * | 6/2005 | Lee et al. ..................... | 528/35 |
| 2005/0136268 | A1 * | 6/2005 | Shin et al. ................... | 428/447 |

FOREIGN PATENT DOCUMENTS

| | | | |
|---|---|---|---|
| JP | 2000334881 | * | 12/2000 |
| JP | 2000334881 | A * | 12/2000 |
| JP | 2005-154771 | A | 6/2005 |

* cited by examiner

*Primary Examiner*—Randy Gulakowski
*Assistant Examiner*—Kara Negrelli
(74) *Attorney, Agent, or Firm*—Sughrue Mion, PLLC

(57) ABSTRACT

A composition comprising: a polymerized substance of a compound (I) that contains m numbers of $RSi(O_{0.5})_3$ units, wherein m represents an integer of from 8 to 16; and R's each independently represents a non-hydrolysable group, provided that at least two among R's represent groups containing a vinyl group or an ethynyl group, and wherein each one of the $RSi(O_{0.5})_3$ units is connected to another one of the $RSi(O_{0.5})_3$ units by sharing an oxygen atom in each one of the $RSi(O_{0.5})_3$ units, so as to form a cage structure, and wherein within a solid component contained in the composition, a polymerized substance formed by a reaction of the compound (I) represents 60 mass % or more.

16 Claims, No Drawings

COMPOSITION, FILM AND PRODUCING METHOD THEREFOR

BACKGROUND OF THE INVENTION

1. Field of the Invention

The present invention relates to a composition, more specifically to a film forming composition, further specifically to a composition which is capable of forming a coated film having an appropriate and uniform thickness, and adapted for use as a material for an interlayer insulating film in a semiconductor device or the like, and which is also useful for forming an insulating film having excellent dielectric characteristics or forming an optical film of a low refractive index, a composition producing method, a film producing method, a film and a semiconductor device.

2. Description of the Related Art

As an interlayer insulating film for use in a semiconductor device and the like, a silica ($SiO_2$) film formed by a vacuum process such as chemical vapor deposition (CVD) has been frequently utilized. Also recently, for the purpose of forming a more uniform interlayer insulating film, a coated-type insulating film, called an SOG (spin-on glass) film and principally constituted of a hydrolysis product of tetraalkoxysilane, is also being utilized. Also with an increase in the level of integration of semiconductor devices and the like, an interlayer insulating film of a low dielectric constant, called organic SOG and principally constituted of polyorganosiloxane, is also being developed.

However, even a $CVD$-$SiO_2$ film, showing a lowest dielectric constant among the inorganic films, has a specific inductivity of about 4. SiOF film, recently investigated as a CVD film of low dielectric constant, has a specific inductivity of about 3.3 to 3.5, but this film involves a drawback of a high hygroscopic property, thus showing an increase in the dielectric constant in the course of use.

In such situation, there is also known a method of employing organopolysiloxane as a material for insulating film excellent in insulating property, heat resistance and durability, and of reducing the dielectric constant by adding a high-boiling solvent or a pyrolyzable compound thereby forming pores therein. However, such porous film, though the dielectric constant is lower by the porous structure, is associated with drawbacks of a lowered mechanical strength and an increase in the dielectric constant by moisture absorption. Also since mutually connected pores are formed, there is involved a drawback that copper used for wiring diffuses in the insulating film.

On the other hand, there is already known a proposal to utilize a siloxane compound having a cage structure for producing an insulating film (cf. JP-A-2005-154771), but this method, being incapable of sufficiently maintaining the cage structure at the preparation of a coating liquid or of an insulating film, has little density reducing effect whereby the dielectric constant cannot be lowered sufficiently.

SUMMARY OF THE INVENTION

Therefore, an object of the present invention is to provide a composition, a film producing method and a film prepared with such method, capable of solving the aforementioned problems, and more specifically is to provide a composition, which is capable of forming a silicone-type film having an appropriate and uniform thickness adapted for use as an interlayer insulating film in a semiconductor device or the like, and which has a low density, a low refractive index, and excellent film properties such as dielectric constant and Young's modulus, also to provide such insulating film and a producing method therefor. (An "insulating film" is also referred to as a "dielectric film" or a "dielectric insulating film", and these terms are not substantially distinguished.)

It is found that the aforementioned object of the present invention is accomplished by following means.

<1> A composition comprising:

a polymerized substance of a compound (I) that contains m numbers of $RSi(O_{0.5})_3$ units, wherein m represents an integer of from 8 to 16; and R's each independently represents a non-hydrolysable group, provided that at least two among R's represent groups containing a vinyl group or an ethynyl group, and wherein each one of the $RSi(O_{0.5})_3$ units is connected to another one of the $RSi(O_{0.5})_3$ units by sharing an oxygen atom in each one of the $RSi(O_{0.5})_3$ units, so as to form a cage structure, and wherein within a solid component contained in the composition, a polymerized substance formed by a reaction of the compounds (I) represents 60 mass % or more.

<2> The composition as described in <1> above, wherein at least two among the groups represented by R's are groups containing a vinyl group.

<3> The composition as described in <1> or <2> above, which is soluble in an organic solvent.

<4> The composition as described in any of <1> to <3> above, wherein a solid component contained in the composition has a polystyrene-converted number-average molecular weight by GPC of from 1,000 to 300,000.

<5> The composition as described in any of <1> to <4> above, wherein a solid component contained in the composition has a polystyrene-converted weight-average molecular weight by GPC of from 5,000 to 1,000,000.

<6> The composition as described in any of <1> to <5> above, wherein a part of the solid component contained in the composition, remaining after elimination of a monomer of the compound (I) on a GPC chart of the solid component, has a polystyrene-converted number-average molecular weight of from 3,000 to 300,000.

<7> The composition as described in any of <1> to <6> above, wherein a part of the solid component contained in the composition, remaining after elimination of a monomer of the compound (I) on a GPC chart of the solid component, has a polystyrene-converted weight-average molecular weight of from 7,000 to 1,000,000.

<8> A method for producing a polymerized substance of a compound (I) that contains m numbers of $RSi(O_{0.5})_3$ units, wherein m represents an integer of from 8 to 16; and R's each independently represents a non-hydrolysable group, provided that at least two among the R's represent groups containing a vinyl group or an ethynyl group, and wherein each of the $RSi(O_{0.5})_3$ units is connected to another one of the $RSi(O_{0.5})_3$ units by sharing an oxygen atom in each one of the $RSi(O_{0.5})_3$ units, so as to form a cage structure, the method comprising:

dissolving the compound (I) in an organic solvent with a concentration equal to or less than 30 mass %; and causing a reaction of the vinyl group or the ethynyl group with a polymerization initiator.

<9> The method for producing a polymerized substance as described in <8> above, wherein the polymerization initiator is added in divided manner or in continuous manner.

<10> The method for producing a polymerized substance as described in <8> or <9> above, wherein a solvent having an ester group in a molecule is utilized as a polymerization solvent.

<11> The producing method as described in any of <8> to <9> above, wherein a concentrating process is executed after the reaction of the vinyl group or the ethynyl group.

<12> The producing method as described in any of <8> to <11> above, wherein a purification by a re-precipitation is executed after the reaction of the vinyl group or the ethynyl group.

<13> A composition comprising a polymerized substance synthesized by a producing method as described in any of <8> to <12> above.

<14> The composition as described in <13> above, wherein within a solid component contained in the composition, a polymerized substance formed by a reaction of the compound (I) represents 60 mass % or more.

<15> The composition as described in any of <1> to <7>, <13> and <14> above, which further comprises an organic solvent.

<16> The composition as described in any of <1> to <7> and <13> to <15> above, which further comprises a surfactant.

<17> The composition as described in any of <1> to <7> and <13> to <16> above, wherein in the composition, the vinyl group or the ethynyl group of the compound (I) remains unreacted in 1 to 90 mol % in average.

<18> The composition as described in any of <1> to <7> and <13> to <17> above, wherein at least one of the polymerization initiator, an additive and the polymerization solvent is bonded by 0.1 to 40 mass % with respect to. the solid component to the reaction product of the compound (I).

<19> The composition as described in any of <1> to <7> and <13> to <18> above, wherein a component having a molecular weight of 3,000,000 or more is substantially absent in a GPC chart of the solid component contained in the composition.

<20> A film forming composition comprising a composition according to any of <1> to <7> and <13> to <19> above.

<21> A film forming composition comprising:

at least one of: a compound (I) that contains m numbers of $RSi(O_{0.5})_3$ units, wherein m represents an integer of from 8 to 16; and R's each independently represents a non-hydrolysable group, and wherein each one of the $RSi(O_{0.5})_3$ units is connected to another one of the $RSi(O_{0.5})_3$ units by sharing an oxygen atom in each one of the $RSi(O_{0.5})_3$ units, so as to form a cage structure; and a reaction product of the compound (I); and an organic solvent.

<22> The film forming composition as described in <21> above, wherein m represents an integer of 12 in the compound (I).

<23> The film forming composition as described in <21> or <22> above, wherein at least two among the groups represented by R's are groups containing a vinyl group.

<24> The film forming composition as described in <21> or <22> above, wherein at least one among the groups represented by R's is a group represented by formula (II):

$(R^1)_3$—Si—O—  (II)

wherein $R^1$'s each independently represents a non-hydrolysable group.

<25> The film forming composition as described in <24> above, wherein at least two among the groups represented by $R^1$'s are groups containing a vinyl group.

<26> The film forming composition as described in any of <21> to <25> above, which comprises at least one of a compound (I) containing 16 or more Si atoms and a reaction product thereof.

<27> The film forming composition as described in any of <21> to <23> above, wherein a proportion of a compound (I) containing 16 or more Si atoms and/or a reaction product thereof to a total amount of the compound (I) and/or the reaction product thereof is 60 mass % or higher.

<28> The film forming composition as described in <27> above, wherein the compound (I) and/or the reaction product thereof is contained by 60 mass % or higher, with respect to all the solid component of the film forming composition.

<29> The film forming composition as described in any of <21> to <28> above, wherein the compound (I) is converted to a high molecular weight, by a hydrosilylation reaction or a polymerization reaction of carbon-carbon unsaturated bonds with each other.

<30> The film forming composition as described in any of <20> to <29> above, which is filtered with a filter of a pore size of from 0.005 to 0.2 µm.

<31> A film producing method comprising:

coating a film forming composition as described in any of <20> to <30> above on a substrate; and curing the coated composition.

<32> A film which is produced by a film producing method as described in <31> above.

<33> A semiconductor device comprising a film as described in <32> above.

<34> A compound comprising 12 numbers of $(R^2)_3$—Si—O—$Si(O_{0.5})_3$ units, wherein $R^2$'s each independently represents a hydrogen atom or a substituent, and wherein each one of the $(R^2)_3$—Si—O—$Si(O_{0.5})_3$ units is connected to another one of the $(R^2)_3$—Si—O—$Si(O_{0.5})_3$ units by sharing an oxygen atom in each one of the $(R^2)_3$—Si—O—$Si(O_{0.5})_3$ units, so as to form a cage structure.

DETAILED DESCRIPTION OF THE INVENTION

The composition of the present invention includes a compound (I), which includes m $RSi(O_{0.5})_3$ units (wherein m represents an integer of from 8 to 16, and R's each independently represents a non-hydrolysable group, provided that at least two among R's represent groups containing a vinyl group or an ethynyl group), and in which each unit is connected to another unit by sharing an oxygen atom in each unit, thereby forming a cage structure, or a reaction product of the compound (I).

In consideration of reducing the dielectric constant, m is preferably 8, 10, 12, 14 or 16, and in consideration of availability, m is more preferably 8, 10 or 12.

A cage structure means a molecule of which a space is defined by plural rings formed by covalent-bonded atoms, and a point positioned within the space cannot leave the space without passing through such rings.

Examples of the cage structure represented by the compound (I) include those shown in the following. In the following, a free bond indicates a bonding position for R.

(Q-1)
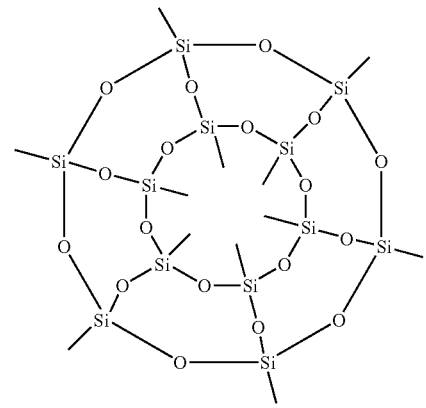

(Q-2)
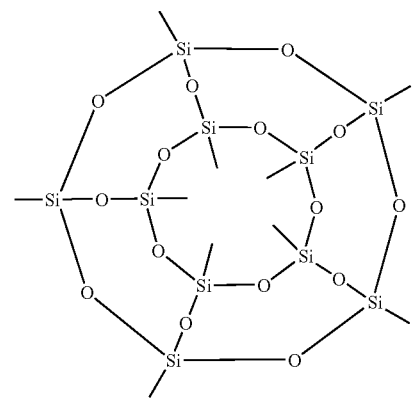

(Q-3)
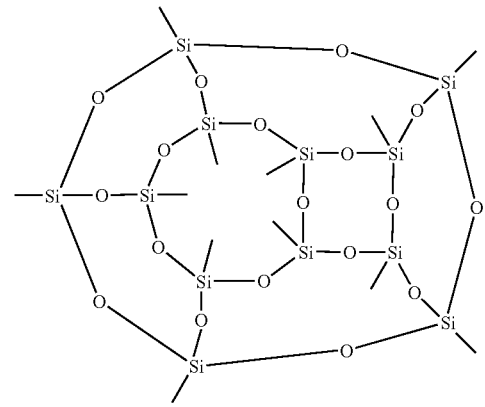

(Q-4)
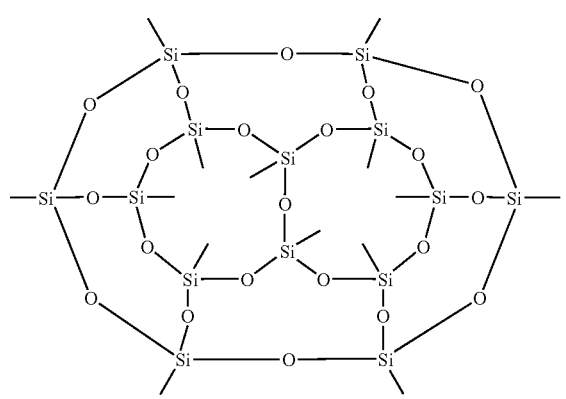

-continued (Q-5)
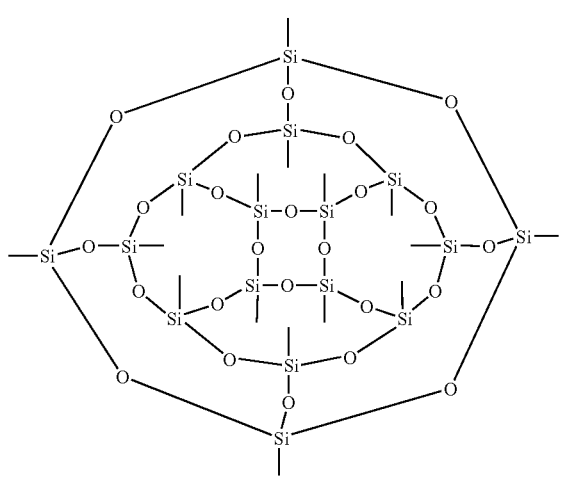

(Q-6)
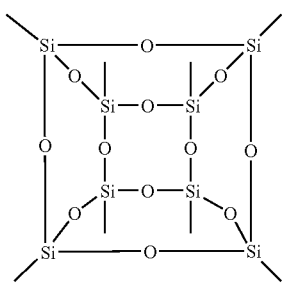

(Q-7)
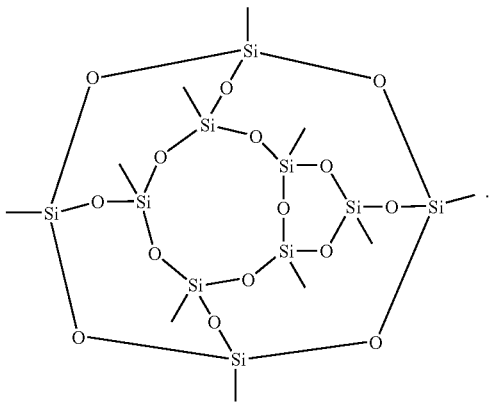

In the compound (I), R's each independently represents a non-hydrolysable group.

A non-hydrolysable group means a group which remains by 95% or more upon contact with neutral water of 1 equivalent amount for 1 hour at the room temperature, and which preferably remains by 99% or more in such condition.

Among R's, at least two are groups including a vinyl group or an ethynyl group. Examples of the non-hydrolysable group R include an alkyl group (such as methyl, t-butyl, cyclopentyl, or cyclohexyl), an aryl group (such as phenyl, 1-naphthyl, or 2-naphthyl), a vinyl group, an ethynyl group, an allyl group, and a silyloxy group (such as trimethylsilyloxy, triethylsilyloxy or t-butyldimethylsilyloxy).

Among the groups represented by R, at least two are preferably groups including a vinyl group or an ethynyl group, and at least two are preferably vinyl groups. In the case where the group represented by R includes a vinyl group or an ethynyl group, the vinyl group or ethynyl group is preferably bonded, either directly or via a divalent linking group, to a silicon atom to which R is bonded. Examples of the divalent linking group include —[C(R$^{11}$)(R$^{12}$)]$_k$—, —CO—, —O—, —N(R$^{13}$)—, —S—, —O—Si(R$^{14}$)(R$^{15}$)— and a divalent linking group formed by an arbitrary combination thereof (R$^{11}$ to R$^{15}$ each independently representing a hydrogen atom, a methyl group, an ethyl group or a phenyl group, and k representing an integer of from 1 to 6). Among these, preferred is —[C(R$^{11}$)(R$^{12}$)]$_k$—, —O—, —O—Si(R$^{14}$)(R$^{15}$)— or a divalent linking group formed by an arbitrary combination thereof.

In the compound (I), it is preferred that the vinyl group or ethynyl group is bonded directly to a silicon atom to which R is bonded.

Among R's in the compound (I), it is more preferable that at least two vinyl groups are directly bonded to silicon atoms to which R's are bonded, further preferable that at least a half of R's in the compound (I) are all formed by vinyl groups, and particularly preferable that R's are all vinyl groups.

Specific examples of the compound (I) are shown below, but the present invention is not limited to such examples.

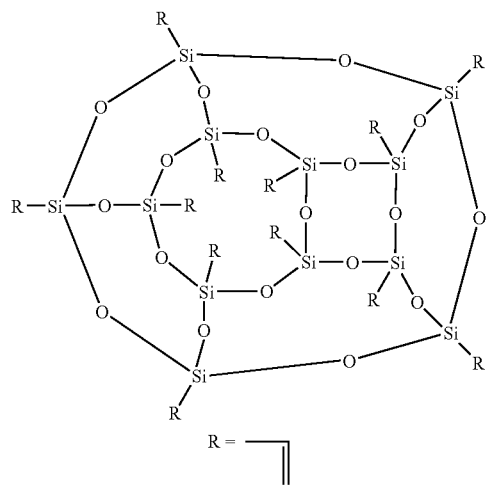

(I-a)

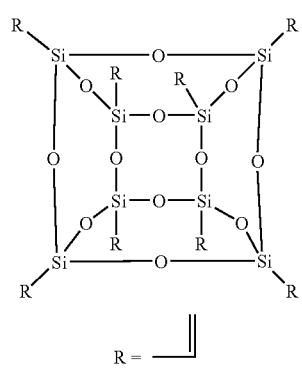

(I-b)

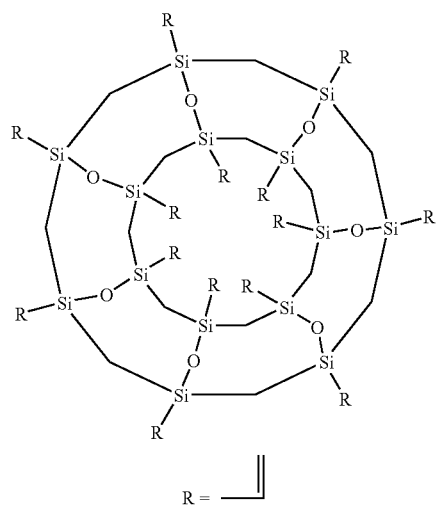

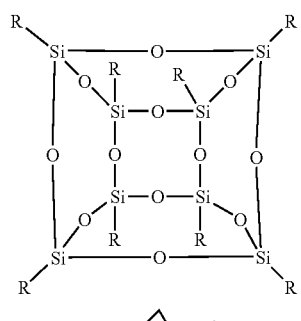

(I-f)

R = 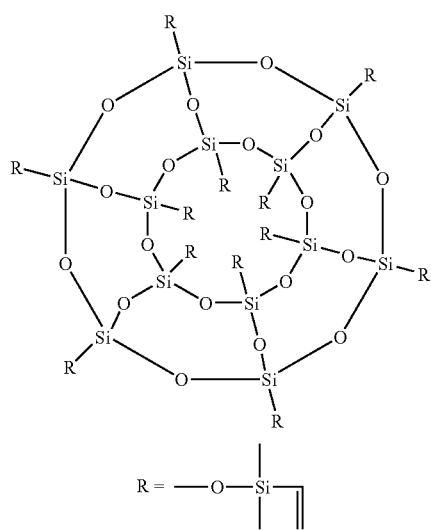

(I-g)

R = —O—Si

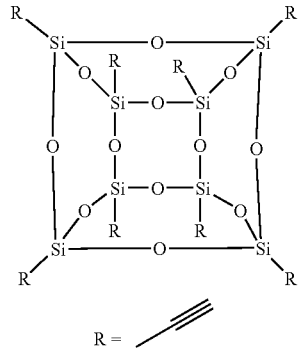

(I-h)

R =

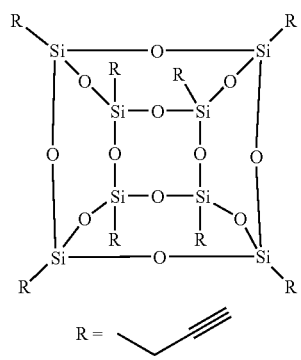

(I-i)

R =

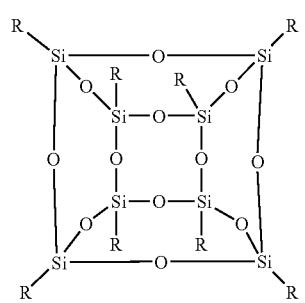

(I-j)

R = —O—Si

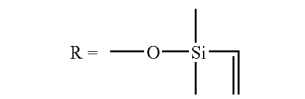

(I-k)

R =

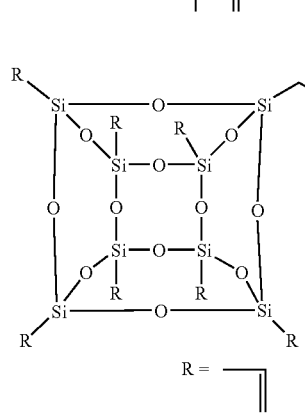

(I-l)

R =

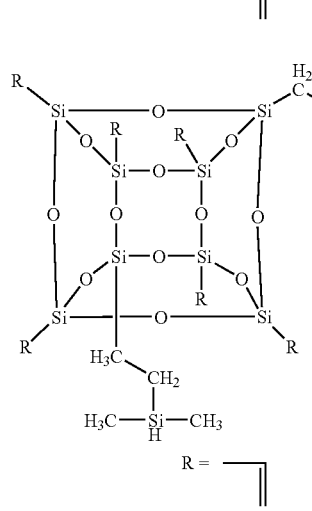

The compound (I) may be available from commercial products or may be synthesized by a known method.

In the case where R is a group represented by the formula (II), it can be synthesized by reacting a compound represented by a formula (III) and a compound represented by a formula (IV).

A compound represented by the formula (III) can be synthesized for example by a method described in Angew. Chem. Int. Ed. Engl. 1997, 36, No. 7, 743-745.

$$[MO—Si(O_{0.5})_3]_m \quad (III)$$

$$(R^1)_3—Si—Cl \quad (IV)$$

In these formulas, m and $R^1$ have same meanings as in the compound (I) and the formula (II); and M represents a metal atom (such as Na, K, Cu, Ni or Mn) or an onium cation (such as tetramethylammonium). In the case where M is a polyvalent metal atom, the formula means a structure in which plural —O—Si(O$_{0.5}$)$_3$ groups are bonded to the polyvalent metal atom M.

The reaction between the compound represented by the formula (III) and the compound represented by the formula (IV) may be conducted, for example, by adding the compound represented by the formula (III) and the compound represented by the formula (IV) in an amount of 1 to 100 molar amounts of the Si—OM groups contained in the compound represented by the formula (III), in a solvent and by agitating the mixture normally at 0 to 180° C. for a period of from 10 minutes to 20 hours.

The solvent is preferably an organic solvent such as toluene, hexane, or tetrahydrofuran (THF).

In the reaction between the compound represented by the formula (III) and the compound represented by the formula (IV), a base such as triethylamine or pyridine may be added.

In the case that the composition of the invention contains the compound (I), the compound (I) preferably contains 16 or more Si atoms.

The composition of the invention may contain plural different compounds (I) or a polymerized substances thereof. In such case, it may be a copolymer formed by plural different compounds (I), or a mixture of homopolymers. In the case that the composition of the invention contains a copolymer formed by plural different compounds (I), it is preferably a copolymer of a mixture of two or more compounds (I) selected from those having m=8, 10 and 12.

The composition of the invention may also be a copolymer with a compound other than the compound (I). A compound to be employed in such case is preferably a compound having a plurality of polymerizable carbon-carbon unsaturated bonds or SiH groups. Examples of the preferred compound include vinylsilanes, vinylsiloxanes, phenylacetylenes and [(HSiO$_{0.5}$)$_3$]$_8$.

The composition of the invention may also be a solution formed by dissolving the compound (I) or a reaction product in an organic solvent, or a solid containing the compound (I) or a reaction product thereof.

In the case that the composition of the invention contains a reaction product of the compounds (I) with each other, the composition of the invention is preferably produced by a hydrosilylation reaction of the compounds (I) or by a polymerization reaction between carbon-carbon unsaturated bonds with each other of the compounds (I).

It is particularly preferable to dissolve the compound (I) in a solvent, and to add a polymerization initiator, thereby causing a reaction of the vinyl group or ethynyl group.

There may be employed a polymerization of any type, such as radical polymerization, cationic polymerization, anionic polymerization, ring-opening polymerization, polycondensation, polyaddition, addition polymerization or polymerization catalyzed by a transition metal.

The polymerization of the compound (I) is preferably conducted in the presence of a non-metallic polymerization initiator. The polymerization may be executed, for example, in the presence of a polymerization initiator, which shows an activity under heating by generating a free radical such as a carbon radical or an oxygen radical.

As the polymerization initiator, an organic peroxide or an organic azo compound is particularly preferably employed.

Preferred Examples of the organic peroxide include ketone peroxides such as Perhexa H, peroxy ketals such as Perhexa TMH, hydroperoxides such as Perbutyl H-69, dialkyl peroxides such as Percumyl D, Perbutyl C or Perbutyl D, diacyl peroxides such as Niper BW, peroxy esters such as Perbutyl Z or Perbutyl L, peroxydicarbonates such as Peroyl TCP, commercially available from Nippon Oils and Fats Co., also diisobutyryl peroxide, cumyl peroxyneodecanoate, di-n-propyl peroxydicarbonate, diisopropyl peroxydicarbonate, di-sec-butyl peroxydicarbonate, 1,1,3,3-tetramethylbutyl peroxyneodecanoate, di(4-t-butylcyclohexyl) peroxydicarbonate, di(2-ethylhexyl) peroxydicarbonate, t-hexyl peroxyneodecanoate, t-butyl peroxyneodecanoate, t-butyl peroxyneoheptanoate, t-hexyl peroxypivalate, t-butyl peroxypivalate, di(3,5,5-trimethylhexanoyl) peroxide, dilauroyl peroxide, 1,1,3,3-tetramethylbutyl peroxy-2-ethylhexanoate, disuccinic acid peroxide, 2,5-dimethyl-2,5-di(2-ethylhexanoylperoxy)hexane, t-hexylperoxy-2-ethyl hexanoate, di(4-methylbenzoyl) peroxide, t-butyl peroxy-2-ethylhexanoate, di(3-methylbenzoyl) peroxide, benzoyl (3-methylbenzoyl) peroxide, dibenzoyl peroxide, 1,1-di(t-butylperoxy)-2-methylcyclohexane, 1,1-di(t-hexylperoxy)-3,3,5-trimethylcyclohexane, 1,1-di(t-hexylperoxy) cyclohexane, 1,1-di(t-butylperoxy)cyclohexane, 2,2-di(4,4-di(t-butylperoxy)cyclohexyl)propane, t-hexyl peroxyisopropylmonocarbonate, t-butyl peroxymaleate, t-butyl peroxy-3,5,5-trimethylhexanoate, t-butyl peroxylaurate, t-butyl peroxyisopropylmonocarbonate, t-butyl peroxy-2-ethylhexylmonocarbonate, t-hexyl peroxybenzoate, 2,5-dimethyl-2,5-di(benzoylperoxy)hexane, t-butyl peroxyacetate, 2,2-di(t-butylperoxy)butane, t-butyl peroxybenzoate, n-butyl 4,4-di-t-butyperoxyvalerate, di(2-t-butylperoxyisopropyl) benzene, dicumyl peroxide, di-t-hexyl peroxide, 2, 5-dimethyl-2, 5-di (t-butylperoxy)hexane, t-butylcumyl peroxide, di-t-butyl peroxide, p-methane hydroperoxide, 2,5-dimethyl-2,5-di(t-butylperoxy)hexine-3, diisopropylbenzene hydroperoxide, 1,1,3,3-tetramethylbutyl hydroperoxide, cumene hydroperoxide, t-butyl hydroperoxide, 2,3-dimethyl-2,3-diphenylbutane, 2,4-dichlorobenzoyl peroxide, o-chlorobenzoyl peroxide, p-chlorobenzoyl peroxide, tris(t-butylperoxy)triazine, 2,4,4-trimethylpentyl peroxyneodecanoate, α-cumyl peroxyneodecanoate, t-amyl peroxy-2-ethylhexanoate, t-butyl peroxyisobutyrate, di-t-butyl peroxyhexahydroterephthalate, di-t-butyl peroxytrimethyladipate, di-3-methoxybutyl peroxydicarbonate, di-isopropyl peroxydicarbonate, t-butyl peroxyisopropylcarbonate, 1,6-bis(t-butylperoxycarbonyloxy)hexane, diethylene glycol bis (t-butylperoxycarbonate), t-hexyl peroxyneodecanoate, and Luperox 11 commercially available from Arkema Yoshitomi Ltd.

Preferred examples of the organic azo compound include azonitrile compounds such as V-30, V-40, V-59, V-60, V-65 and V-70, azoamides such as VA-080, VA-085, VA-086, VF-096, VAm-110 and VAm-111, cyclic azoamidine compounds such as VA-044 and VA-061, and azoamidine compounds such as V-50 and VA-057, commercially available from Wako Pure Chemical Industries, Ltd., and also 2,2-azobis(4-methoxy-2,4-dimethylvaleronitrile), 2,2-azobis(2, 4-dimethylvaleronitrile), 2,2-azobis(2-methylpropionitrile), 2,2-azobis(2,4-dimethylbutyronitrile), 1,1-azobis(cyclohexane-1-carbonitrile), 1-[(1-cyano-1-methylethyl)azo]formamide, 2,2-azobis{2-methyl-N-[1,1-bis(hydroxymethyl)-2-hydroxyethyl]propionamide}, 2,2-azobis{2-methyl-N-[2-(1-hydroxybutyl)]propionamide}, 2,2-azobis[2-methyl-N-(2-hydroxyethyl)-propionamide], 2,2-azobis[N-(2-propenyl)-2-methylpropionamide], 2,2-azobis(N-butyl-2-methylpropionamide), 2,2-azobis(N-cyclohexyl-2-methylpropionamide), 2,2-azobis[2-(2-imidazolin-2-yl) propane] dihydrochloride, 2,2-azobis[2-(2-imidazolin-2-yl) propane] disulfate dihydrate, 2,2-azobis{2-[1-(2-hydroxyethyl)-2-imidazolin-2-yl]propane} dihydrochloride, 2,2-azobis[2-(2-imidazolin-2-yl)propane], 2,2-azobis(1-imino-1-pyrrolidino-2-methyl-propane) dihydrochloride, 2,2-azobis(2-methylpropionamidine) dihydrochloride, 2,2-azobis[N-(2-carboxyethyl)-2-methyl-propionamidine]tetrahydrate, dimethyl 2,2-azobis(2-methylpropionate), 4,4-azobis(4-cyanovaleric acid), and 2,2-azobis(2,4,4-trimethylpentane).

As the polymerization initiator, an organic peroxide is preferable, among which an alkyl peroxy ester and a dialkyl peroxide are particularly preferable.

The polymerization initiator in the invention may be utilized singly, or in a mixture of two or more kinds.

The polymerization initiator in the invention is preferably employed in an amount, with respect to 1 mole of monomer, of from 0.001 to 2 moles, more preferably from 0.05 to 1 mole, and particularly preferably from 0.01 to 0.5 moles.

The polymerization initiator in the invention may be added in a collective addition, a divided addition or a continuous addition, but a divided addition or a continuous addition is preferable as a high molecular weight can be attained with a limited amount of the polymerization initiator, and it is advantageous in terms of the mechanical strength of the film.

The solvent to be employed in the polymerization reaction may be any solvent which is capable of dissolving the compound (I) at a necessary concentration and which does not cause a detrimental effect on the characteristics of a film to be formed from an obtained polymerized substance. Examples of the solvent include water; an alcoholic solvent, such as methanol, ethanol or propanol; a ketone solvent, such as acetone, methyl ethyl ketone, methyl isobutyl ketone, cyclohexanone, or acetophenone; an ester solvent, such as methyl acetate, ethyl acetate, propyl acetate, isopropyl acetate, butyl acetate, pentyl acetate, hexyl acetate, methyl propionate, ethyl propionate, propylene glycol monomethyl ether acetate, γ-butyrolactone, or methyl benzoate; an ether solvent such as dibutyl ether, anisole, or tetrahydrofuran; an aromatic hydrocarbon solvent such as toluene, xylene, mesitylene, 1,2,4,5-tetramethylbenzene, pentamethylbenzene, isopropylbenzene, 1,4-diisopropylbenzene, t-butylbenzene, 1,4-di-t-butylbenzene, 1,3,5-triethylbenzene, 1,3,5-tri-t-butylbenzene, 4-t-butyl-o-xylene, 1-methylnaphthalene or 1,3,5-triisopropylbenzene; an amide solvent such as N-methylpyrrolidinone, or dimethylacetamide; a halogenated solvent such as carbon tetrachloride, dichloromethane, chloroform, 1,2-dichloroethane, chlorobenzene, 1,2-dichlorobenzene, or 1,2,4-trichlorobenzene; and an aliphatic hydrocarbon solvent such as hexane, heptane, octane, or cyclohexane. Among these, more preferred is an ester solvent, particularly methyl acetate, ethyl acetate, propyl acetate, isopropyl acetate, butyl acetate, pentyl acetate, hexyl acetate, methyl propionate, ethyl propionate, propylene glycol monomethyl ether acetate, γ-butyrolactone, or methyl benzoate. In the description described above, for example, an ester solvent is a solvent having an ester group within a molecule. Such solvent may be employed singly or in a mixture of two or more kinds.

For a same solvent, the compound (I) having a lower concentration at the polymerization allows to easily synthesize a composition that is larger in the weight-average molecular weight and in the number-average molecular weight and is soluble in the organic solvent. From this reason, the compound (I) in the reaction solution preferably has a concentration of 30 mass % or less, more preferably 10 mass % or less, and further preferably 5 mass % or less. (In this specification, mass ratio is equal to weight ratio.)

From the standpoint of productivity at the reaction, a higher concentration of the compound (I) at the polymerization is advantageous. For this reason, the compound (I) in the reaction solution preferably has a concentration of 0.1 mass % or higher, more preferably 1 mass % or higher.

Conditions optimum for the polymerization reaction of the invention are variable depending on a polymerization initiator, a monomer, a solvent type, a concentration and the like, but include an internal temperature preferably within a range of from 0 to 200° C., more preferably from 40 to 170° C. and particularly preferably from 70 to 150° C., and a period preferably within a range of from 1 to 50 hours, more preferably from 2 to 20 hours and particularly preferably from 3 to 10 hours.

Also in order to suppress a deactivation of the polymerization initiator by oxygen, the reaction is preferably executed in an atmosphere of an inert gas (such as nitrogen or argon). An oxygen concentration at the reaction is preferably 100 ppm or less, more preferably 50 ppm or less, and particularly preferably 20 ppm or less.

The polymer obtained by polymerization has a weight-average molecular weight (Mw) preferably within a range of from 5,000 to 1,000,000, more preferably 20,000 to 800,000, and particularly preferably from 80,000 to 600,000.

Within a solid component contained in the composition of the invention, it is preferred that a sum of the compound (I) and a polymerized substance formed by the reaction of the compounds (I) with each other represents 60 mass % or more, and such sum preferably represents 80 mass % or more, further preferably 90 mass % or more, and most preferably 95 mass % or more. Within the compound (I) and the reaction product thereof contained in the composition of the invention, it is preferred that a compound (I) containing 16 or more Si atoms and a reaction product thereof represents 60 mass % or more, and such polymerized substance preferably represents 80 mass % or more, further preferably 90 mass % or more, and most preferably 95 mass % or more.

A larger content of these in the solid component allows to obtain a film which is lower in the density, refractive index and dielectric constant.

The solid component used herein means components, obtained by subtracting volatile components from all the components contained in the composition. The volatile components includes a component which evaporates after a decomposition to a low-molecular compound. Examples of the volatile component include water, an organic solvent, a pyrolyzable polymer and a heat-releasable substituent.

Components other than the polymerized substance formed by the reaction of the compounds (I) with each other, contained in the solid component in the invention, include for example a non-volatile compound (I), a component other than a reaction product of the compound (I), contained in a copolymerized substance containing the reaction product of the compound (I), and a non-volatile additive.

The remaining compound (I) can be quantified from a GPC chart, an HPLC chart, an NMR chart, a UV spectrum, an IR spectrum and the like of the solid component. A component in the copolymerized substance may be quantified from a charging ratio, but can also be quantified by purifying the solid component, if necessary, and by executing a measurement of an NMR spectrum, a UV spectrum, an IR spectrum or an elementary analysis.

The non-volatile additive may be quantified by a method of utilizing an added amount as an amount present in the solid component, or from a GPC chart or an HPLC chart of the solid component, but can also be quantified by purifying the solid component, if necessary, and by executing a measurement of an NMR spectrum, a UV spectrum, an IR spectrum or an elementary analysis.

The polymerized substance of the compounds (I) with each other is a remainder after removing these from the solid component.

The composition of the invention is preferably soluble in an organic solvent. Being soluble in organic solvent is defined as being soluble by 5 mass % or more, at 25° C., in a solvent selected from cyclohexane, methyl ethyl ketone, methyl isobutyl ketone, propylene glycol monomethyl ether acetate and γ-butyrolactone, but it is preferably soluble by 10 mass % or more and more preferably by 20 mass % or more.

In the case that the composition of the invention includes a reaction product of the compounds (I) with each other, the solid component in the composition of the invention has a polystyrene-converted GPC weight-average molecular weight (Mw) preferably within a range of from 5,000 to 1,000,000, more preferably from 20,000 to 800,000, further preferably from 40,000 to 600,000, still further preferably from 80,000 to 600,000, and most preferably 120,000 to 600,000.

In the invention, the GPC was conducted utilizing Waters 2695 and Shodex GPC column KF-805L, at a column temperature of 40° C., and utilizing tetrahydrofuran as an eluting solvent at a flow rate of 1 ml/min, and 50 µl of a tetrahydrofuran solution with a sample concentration of 0.5 mass % were injected. A calibration line for the monomer was prepared utilizing an integrated value of an RI detecting apparatus (Waters 2414), for quantifying the monomer in the solid. Mn and Mw were values calculated with a calibration line prepared with standard polystyrene.

In the composition of the invention, it is preferred that a part of the solid component contained therein, after elimination of a monomer of the compound (I) from a GPC chart of the solid component, has a polystyrene-converted weight-average molecular weight of from 7,000 to 1,000,000, and such molecular weight is preferably from 25,000 to 800,000, more preferably from 50,000 to 600,000, still more preferably from 100,000 to 600,000, and most preferably 140,000 to 600,000.

In the case that the composition of the invention includes a reaction product of the compounds (I) with each other, the solid component in the composition of the invention has a polystyrene-converted number-average molecular weight (Mn) by GPC, preferably of from 1,000 to 300,000, more preferably from 3,000 to 250,000, still more preferably from 10,000 to 200,000, further preferably from 20,000 to 200,000, and most preferably from 30,000 to 200,000.

In the case that the composition of the invention includes a reaction product of the compounds (I) with each other, it is preferred that a part of the solid component contained therein, remaining after elimination of a monomer of the compound (I) from a GPC chart of the solid component, has Mn of from 3,000 to 300,000, and such Mn is preferably from 6,000 to 250,000, more preferably from 12,000 to 200,000, still more preferably from 24,000 to 200,000, and most preferably from 36,000 to 200,000.

Such larger value of the average molecular weight allows to form a film that is lower in the density, refractive index and dielectric constant, but such larger value of the average molecular weight tends to generate an insoluble substance in the organic solvent. The average molecular weight within the aforementioned range allows to obtain a low density, a low refractive index and a low dielectric constant, and also a solubility in the organic solvent and a filtrability at the same time.

The polymer of the invention is preferably substantially free from a component having a molecular weight of 3,000,000 or larger, more preferably substantially free from a component having a molecular weight of 2,000,000 or larger, and most preferably substantially free from a component having a molecular weight of 1,000,000 or larger.

In the case that the composition of the invention includes a reaction product of the compounds (I) with each other, the solid component contained in the composition of the invention has a dispersion (Mw/Mn), as calculated from a GPC chart, preferably of from 1 to 15, more preferably from 1 to 10 and most preferably from 1 to 5. For a same Mw value, a smaller dispersion allows to form a film that is lower in the density, refractive index and dielectric constant.

In the case that the composition of the invention includes a reaction product of the compounds (I) with each other, an unreacted compound (I) is 40 mass % or less in the solid component contained in the composition of the invention, and is preferably 20 mass % or less, more preferably 10 mass % or less, further preferably 5 mass % or less and most preferably 2 mass % or less.

In the case that the composition of the invention includes a reaction product of the compounds (I) with each other, in the solid component contained in the composition of the invention, the vinyl group or ethynyl group of the compound (I) preferably remains unreacted in a proportion of from 1 to 90 mol %, more preferably remains unreacted in a proportion of from 5 to 80 mol %, and most preferably remains unreacted in a proportion of from 10 to 70 mol %.

Also in the composition of the invention, a polymerization initiator, an additive or a polymerization solvent may be bonded in an amount of from 0.1 to 40 mass % with respect to the solid component to the reaction product of the compound (I), preferably from 0.1 to 20 mass %, more preferably from 0.1 to 10 mass % and most preferably from 0.1 to 5 mass % with respect to the solid component.

These amounts may be quantified for example from an NMR spectrum of the composition.

In the case that the composition of the invention includes a reaction product of the compounds (I) with each other, the composition of the invention preferably contains granular polymer containing the polymerized substance of the compound (I). The granular polymer preferably has a particle size of from 1 to 200 nm, more preferably from 2 to 100 nm, further preferably 3 to 50 nm, and most preferably 3 to 10 nm.

The particle size can be measured, for example, by a light scattering method.

For producing the composition having the aforementioned properties, there may be utilized, at the polymerization of the compound (I), a method of utilizing a highly diluted condition, adding a chain shifting agent, optimizing the reaction solvent, continuously adding the polymerization initiator, continuously adding the compound (I), adding a radical trapping agent or utilizing living polymerization.

There may also be utilized, after the polymerization of the compound (I), a method of filtering off an insoluble matter, executing a purification by column chromatography, or executing a purification by re-precipitation process.

The re-precipitation process means to precipitate the composition of the invention, by adding a poor solvent (solvent which does not substantially dissolve the composition of the invention) to the reaction liquid after distilling off the reaction solvent if necessary, or by dropwise adding the reaction liquid after distilling off the reaction solvent if necessary to a poor solvent, and recovering the composition of the invention by filtration.

The poor solvent is preferably an alcohol (such as methanol, ethanol, or isopropyl alcohol) or a hydrocarbon (such as hexane or heptane). The poor solvent is preferably employed from an equal amount to a 200 times amount of the composition of the invention in weight, preferably from 2 to 50 times amount in weight. By conducting a reprecipitation treatment, a film having lower density, refractive index and dielectric constant can be formed.

In case of producing the composition of the invention, the reaction liquid after executing the polymerization reaction of the compound (I) may directly utilized as the composition of the invention, but is preferably used after executing a concentrating process by distilling off the reaction solvent, or after executing a re-precipitation process.

The concentrating process is preferably executed by heating the reaction liquid and/or maintaining the reaction liquid under a reduced pressure, in a rotary evaporator, a distilling apparatus or a reactor in which the polymerization reaction is executed. The temperature of the reaction liquid at the concentrating process is generally from 0 to 180° C., preferably from 10 to 140° C., more preferably from 20 to 100° C., and most preferably 30 to 60° C. The pressure of the reaction liquid at the concentrating process is generally from 0.133 Pa to 100 kPa, preferably from 1.33 Pa to 13.3 kPa, and more preferably from 1.33 Pa to 1.33 kPa.

In case of concentrating the reaction liquid, the concentration is preferably executed until the solid content in the reaction liquid reaches 10 mass % or higher, more preferably 30 mass % or higher, and most preferably 50 mass % or higher. In the composition of the invention and its production method, a polymerization inhibitor may be added in order to prevent polymerization beyond necessity. Examples of a polymerization inhibitor include 4-methoxyphenol and catechol.

In the present invention, the polymerized substance of the compound (I) is preferably used by dissolving in an appropriate solvent and by coating on a substrate. Examples of the usable solvent include ethylene dichloride, cyclohexanone, cyclopentanone, 2-heptanone, methyl isobutyl ketone, γ-butyrolactone, methyl ethyl ketone, methanol, ethanol, dimethylimidazolidinone, ethylene glycol monomethyl ether, ethylene glycol monoethyl ether, ethylene glycol dimethyl ether, 2-methoxyethyl acetate, ethylene glycol monoethyl ether acetate, propylene glycol monomethyl ether (PGME), propylene glycol monomethyl ether acetate (PGMEA), tetraethylene glycol dimethyl ether, triethylene glycol monobutyl ether, triethylene glycol monomethyl ether, isopropanol, ethylene carbonate, ethyl acetate, butyl acetate, methyl lactate, ethyl lactate, methyl methoxypropionate, ethyl ethoxypropionate, methyl pyruvate, ethyl pyruvate, propyl pyruvate, N,N-dimethylformamide, dimethylacetamide, dimethylsulfoxide, N-methylpyrrolidone, tetrahydrofuran, diisopropylbenzene, toluene, xylene, and mesitylene, and such solvents may be utilized singly or in a mixture.

Among these, preferred examples of the solvent include propylene glycol monomethyl ether acetate, propylene glycol monomethyl ether, 2-heptanone, cyclohexanone, γ-butyrolactone, ethylene glycol monomethyl ether, ethylene glycol monoethyl ether, ethylene glycol monoethyl ether acetate, propylene glycol monomethyl ether, propylene glycol monoethyl ether, ethylene carbonate, butyl acetate, methyl lactate, ethyl lactate, methyl methoxypropionate, ethyl ethoxypropionate, N-methylpyrrolidone, N,N-dimethylformamide, tetrahydrofuran, methyl isobutyl ketone, xylene, mesitylene and diisopropylbenzene.

A solution obtained by dissolving the composition of the invention in an appropriate solvent is also included in the scope of the composition of the invention. A total solid concentration in the solution of the invention is preferably within a range of from 1 to 30 mass %, and is suitably regulated according to the purpose of use. A total solid concentration of the composition within a range of from 1 to 30 mass % provides a thickness of a coated film within an appropriate range, and a better storage stability of the coating liquid.

The composition of the invention may contain a polymerization initiator, but the polymerization initiator is preferably absent as the storage stability of the composition can be improved.

However, when it is necessary to cure the composition of the invention at a low temperature, the polymerization initiator is preferably contained. In such case, examples of the polymerization initiator may be same as those cited above. Also an initiator which induces a polymerization by a radiation may also be utilized for this purpose.

In the composition of the invention, a metal content as an impurity is preferably sufficiently low. The metal concentration in the composition can be measured with a high sensitivity by ICP-MS, and, a metal content other than transition metals is preferably 30 ppm or less, more preferably 3 ppm or less and particularly preferably 300 ppb or less. Also the transition metal preferably has a content as low as possible, as it has a high catalytic function for accelerating the oxidation and elevates the dielectric constant of the film obtained in the invention by an oxidation reaction in a prebake process or a thermal curing process, and the content is preferably 10 ppm or less, more preferably 1 ppm or less and particularly preferably 100 ppb or less.

The metal concentration in the composition may also be evaluated by a total-reflection fluorescent X-ray measurement on a film obtained with the composition of the invention. In case of utilizing W-line as the X-ray source, observable metal elements include K, Ca, Ti, Cr, Mn, Fe, Co, Ni, Cu, Zn and Pd, each of which is contained preferably in an amount of $100 \times 10^{10}$ cm$^{-2}$ or less, more preferably $50 \times 10^{10}$ cm$^{-2}$ or less, and particularly preferably $10 \times 10^{10}$ cm$^{-2}$ or less. Also among halogens, Br is observable, and a remaining content thereof is preferably $10000 \times 10^{10}$ cm$^{-2}$ or less, more preferably $1000 \times 10^{10}$ cm$^{-2}$ or less, and particularly preferably $400 \times 10^{10}$ cm$^{-2}$ or less. Among halogens, Cl is also observable, and, since it causes a damage to a CVD apparatus, an etching apparatus and the like, a remaining content content thereof is preferably $100 \times 10^{10}$ cm$^{-2}$ or less, more preferably $50 \times 10^{10}$ cm$^{-2}$ or less, and particularly preferably $10 \times 10^{10}$ cm$^{-2}$ or less.

In the composition of the invention, additives such as a radical generating agent, colloidal silica, a surfactant, a silane coupling agent and an adhesion promoter may be added within an extent not deteriorating the characteristics (heat resistance, dielectric constant, mechanical strength, coating property, adhesivity etc.) of the obtained insulating film.

In the present invention, any colloidal silica may be utilized, for example a dispersion liquid obtained by dispersing silicic anhydride of a high purity in a hydrophilic organic solvent or in water, generally having an average particle size of from 5 to 30 nm, preferably from 10 to 20 nm, and a solid concentration of about from 5 to 40 mass %.

In the present invention, any surfactant may be utilized, and examples thereof include a nonionic surfactant, an anionic surfactant, and a cationic surfactant, and also include a silicone-type surfactant, a fluorine-containing surfactant, a polyalkylene oxide surfactant, and an acrylic surfactant. The surfactant to be employed in the invention may be one kind, or two or more kinds. As the surfactant, a silicone surfactant, a nonionic surfactant, a fluorine-containing surfactant or an acrylic surfactant is preferable, and a silicone surfactant is particularly preferable.

The surfactant to be used in the present invention is preferably used in an amount of from 0.01 to 1 mass % with respect to the entire amount of the film forming coating liquid, and more preferably from 0.1 to 0.5 mass %.

In the invention, a silicon surfactant means a surfactant containing at least a Si atom. The silicone surfactant to be used in the invention may be any silicone surfactant, but preferably has a structure including alkylene oxide and dimethylsiloxane, and more preferably has a structure including the following chemical formula:

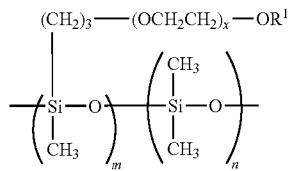

wherein $R^1$ represents a hydrogen atom or an alkyl group containing 1 to 5 carbon atoms; x represents an integer of from 1 to 20; and m and n each independently represents an integer of from 2 to 100; in which plural $R^1$'s may be mutually same or different.

Examples of the silicon surfactant usable in the invention include BYK306 and BYK307 (manufactured by Byk Chemie); SH7PA, SH21PA, SH28PA, and SH30PA (manufactured by Toray-Dow Corning Silicone Co.), and Troysol S366 (manufactured by Troy Chemical Inc.).

The nonionic surfactant usable in the invention may be any nonionic surfactant, and examples thereof include a polyoxyethylene alkyl ether, a polyoxyethylene aryl ether, a polyoxyethylene dialkyl ester, a sorbitan fatty acid ester, a fatty acid-denatured polyoxyethylene, and a polyoxyethylene-polyoxypropylene block copolymer.

In the invention, any fluorine-containing surfactant may be employed, for example perfluorooctyl polyethylene oxide, perfluorodecyl polyethylene oxide or perfluorododecyl polyethylene oxide.

In the invention, any acrylic surfactant may be employed, such as a (meth)acrylic acid copolymer.

In the invention, any silane coupling agent may be employed, and examples thereof include 3-glycidyloxypropyl trimethoxysilane, 3-aminoglycidyloxypropyl triethoxysilane, 3-methacryloxypropyl trimethoxysilane, 3-glycidyloxypropylmethyl dimethoxysilane, 1-methacryloxypropylmethyl dimethoxysilane, 3-aminopropyl trimethoxysilane, 3-aminopropyl triethoxysilane, 2-aminopropyl trimethoxysilane, 2-aminopropyl triethoxysilane, N-(2-aminoethyl)-3-aminopropyl trimethoxysilane, N-(2-aminoethyl)-3-aminopropylmethyl dimethoxysilane, 3-ureidopropyl trimethoxysilane, 3-ureidopropyl triethoxysilane, N-ethoxycarbonyl-3-aminopropyl trimethoxysilane, N-ethoxycarbonyl-3-aminopropyl triethoxysilane, N-triethoxysilylpropyl triethylenetriamine, N-trimethoxysilylpropyl triethylenetriamine, 10-trimethoxysilyl-1,4,7-triazadecane, 10-triethoxysilyl-1,4,7-triazadecane, 9-trimethoxysilyl-3,6-diazanonyl acetate, 9-triethoxysilyl-3,6-diazanonyl acetate, N-benzyl-3-aminopropyl trimethoxysilane, N-benzyl-3-aminopropyl triethoxysilane, N-phenyl-3-aminopropyl trimethoxysilane, N-phenyl-3-aminopropyl triethoxysilane, N-bis(oxyethylene)-3-aminopropyl trimethoxysilane, and N-bis(oxyethylene)-3-aminopropyl triethoxysilane. In the present invention, the silane coupling agent may be employed in one kind or in two or more kinds.

In the present invention, any adhesion promoter may be employed, and examples thereof include trimethoxysilylbenzoic acid, γ-methacryloxypropyl trimethoxysilane, vinyltriacetoxysilane, vinyltrimethoxysilane, γ-isocyanatepropyl triethoxysilane, γ-glycidoxypropyl trimethoxysilane, β-(3,4-epoxycyclohexyl)ethyl trimethoxysilane, trimethoxyvinylsilane, γ-aminopropyl triethoxysilane, aluminum monoethylacetacetate diisopropylate, vinyl tris(2-methoxyethoxy)silane, N-(2-aminoethyl)-3-aminopropylmethyl dimethoxysilane, N-(2-aminoethyl)-3-aminopropyl trimethoxysilane, 3-chloropropylmethyl dimethoxysilane, 3-chloropropyl trimethoxysilane, 3-methacryloxypropyl trimethoxysilane, 3-mercaptopropyl trimethoxysilane, trimethylchlorosilane, dimethylvinylchlorosilane, methyldiphenylchlorosilane, chloromethyldimethylchlorosilane, trimethylmethoxysilane, dimethyldiethoxysilane, methyldimethoxysilane, dimethylvinylethoxysilane, diphenyldimethoxysilane, phenyltriethoxysilane, hexamethyldisilazane, N,N'-bis(trimethylsilyl)urea, dimethyltrimethylsilylamine, trimethylsilylimidazole, vinyltrichlorosilane, benzotriazole, benzimidazole, indazole, imidazole, 2-mercaptobenzimidazole, 2-mercaptobenzothiazole, 2-mercaptobenzoxazole, urazole, thiouracil, mercaptoimidazole, mercaptopyrimidine, 1,1-dimethylurea, 1,3-dimethylurea, and a thiourea compound. A functional silane coupling agent is preferable as an adhesion promoter. The adhesion promoter is used preferably in an amount of 10 parts by mass or less, with respect to 100 parts by mass of all the solid components, and particularly preferably of from 0.05 to 5 parts by mass.

In the composition of the invention, a pore forming factor may be utilized, within a range permissible by the mechanical strength of the film, for forming a porous film and for reducing the dielectric constant.

A pore forming factor, in an additive constituting a pore forming agent, is not particularly restricted, but a non-metallic compound is employed advantageously, which has to simultaneously satisfy a solubility in the solvent in the film-forming coating liquid and a mutual solubility with the polymerized substance of the invention.

A polymer may also be utilized as the pore forming agent. Examples of the polymer usable as the pore forming agent include an aromatic polyvinyl compound (such as polystyrene, polyvinylpyridine, or a halogenated aromatic polyvinyl compound), polyacrylonitrile, polyalkylene oxide (such as polyethylene oxide or polypropylene oxide), polyethylene, polylactic acid, polysiloxane, polycaprolactone, polycaprolactam, polyurethane, polymethacrylate (such as polymethyl methacrylate) or polymethacrylic acid, polyacrylate (such as polymethyl acrylate) or polyacrylic acid, polydiene (such as polybutadiene or polyisoprene), polyvinyl chloride, polyacetal, an amine-capped alkylene oxide, polyphenylene oxide, poly(dimethylsiloxane), polytetrahydrofuran, polycyclohexylethylene, polyethyloxazoline, polyvinylpyridine, and polycaprolactone.

In particular, polystyrene is advantageously usable as the pore forming agent. Examples of polystyrene include anionically polymerized polystyrene, syndiotactic polystyrene and non-substituted and substituted polystyrene (such as poly(α-methylstyrene)), among which a non-substituted polystyrene is preferable.

Also a thermoplastic polymer may be utilized as the pore forming agent. Examples of the thermoplastic polymer usable as the pore forming agent include polyacrylate, polymethacrylate, polybutadiene, polyisoprene, polyphenylene oxide, polypropylene oxide, polyethylene oxide, poly(dimethylsiloxane), polytetrahydrofuran, polyethylene, polycyclohexylethylene, polyethyloxazoline, polycaprolactone, polylactic acid and polyvinylpyridine.

Such pore forming agent has a boiling temperature or a decomposition temperature of preferably from 100 to 500° C., more preferably from 200 to 450° C. and particularly preferably from 250 to 400° C. The molecular weight thereof is preferably from 200 to 50,000, more preferably from 300 to 10,000 and particularly preferably from 400 to 5,000.

The pore forming agent is used in an amount, in mass % with respect to the film-forming polymerized substance, of preferably from 0.5 to 75%, more preferably from 0.5 to 30% and particularly preferably from 1 to 20%.

The pore forming factor may include a decomposable group in a polymer, with a decomposition temperature thereof of preferably from 100 to 500° C., more preferably from 200 to 450° C. and particularly from 250 to 400° C. A content of the decomposable group is, in mol % with respect to the film-forming polymerized substance, of preferably from 0.5 to 75%, more preferably from 0.5 to 30% and particularly preferably from 1 to 20%.

The film forming composition of the invention is used for film formation preferably after elimination of insoluble matters, gel-like components and the like by a filtration. A filter to be used for such purpose preferably has a pore size of from 0.001 to 0.2 μm, more preferably from 0.005 to 0.05 μm, and most preferably from 0.005 to 0.03 μm. The filter is preferably made of PTFE, polyethylene or nylon, and more preferably made of polyethylene or nylon.

A film, obtained with the film forming composition of the present invention, can be formed by coating the film forming composition by an arbitrary method such as spin coating, roller coating, dip coating, scan coating, spray coating or bar coating, on a substrate such as a silicon wafer, a $SiO_2$ wafer, a SiN wafer, a glass or a plastic film and by eliminating the solvent by a heating process if necessary. The coating on the substrate is preferably executed by spin coating or scan coating, particularly preferably by spin coating. For the spin coating, a commercially available apparatus is usable, such as that of Clean Track series (manufactured by Tokyo Electron Co.), that of D-spin series (manufactured by Dai-Nippon Screen Co.), or that of SS series or CS series (manufactured by Tokyo Oka Kogyo Co.). The spin coating may be conducted at any rotation speed, but, in consideration of in-plane uniformity of the film, a rotation speed of about 1300 rpm is preferable for a 300 mm silicon substrate. Also the dispensing of the solution of the composition may be a dynamic dispense in which the solution of the composition is dispensed onto a rotating substrate, or a static dispense in which the solution of the composition is dispensed onto a stopped substrate, but the dynamic dispense is preferred in consideration of the in-plane uniformity of the film. Also for the purpose of suppressing a consumption of the composition, it is also possible to adopt a method of preliminarily dispensing a main solvent of the composition onto the substrate thereby forming a liquid film, and dispensing the composition thereon. A time for spin coating is not particularly restricted, but is preferably 180 seconds or less in consideration of the throughput. Also in consideration of conveying of the substrate, there is also preferred a process (edge rinse, back rinse) for not leaving the film on an edge portion of the substrate. The heat treatment is not particularly restricted in a method thereof, and may be executed by a hot plate heating method, a heating method utilizing a furnace, or a light-irradiation heating method utilizing a xenon lamp in an RTP (rapid thermal processor) or the like, employed ordinarily. There is preferably utilizing a hot plate heating method or a furnace heating method. For the hot plate, a commercially available apparatus is usable, such as that of Clean Track series (manufactured by Tokyo Electron Co.), that of D-spin series (manufactured by Dai-Nippon Screen Co.), or that of SS series or CS series (manufactured by Tokyo Oka Kogyo Co.). For the furnace, equipment of α-series (manufacture by Tokyo Electron Co.) is advantageously employed.

The polymerized substance of the invention is preferably cured after coating on the substrate. The curing means to harden the composition on the substrate, thereby giving a solvent resistance to the film. The curing is particularly preferably executed by a heating treatment. For example, there may be utilized a polymerization reaction of vinyl groups, remaining in the polymerized substance, at a post heating. Such post heating treatment is executed preferably at a temperature of from 100 to 450° C., more preferably from 200 to 420° C., and particularly preferably from 350 to 400° C., for a period preferably of from 1 minute to 2 hours, more preferably from 10 minutes to 1.5 hours, and particularly preferably from 30 minutes to 1 hour. The post heating treatment may be executed several times in divided manner. Also the post heating is particularly preferably executed in a nitrogen atmosphere, in order to prevent thermal oxidation by oxygen.

Also in the present invention, the curing may be executed, instead of a heating treatment, by an irradiation of a high-energy ray, thereby causing a polymerization reaction in the vinyl groups or ethynyl groups remaining in the polymerized substance. The high-energy ray includes an electron beam, an ultraviolet light and an X-ray, but these are not restrictive.

In case of utilizing an electron beam as the high-energy ray, an energy thereof is preferably from 0 to 50 keV, more preferably from 0 to 30 keV and particularly from 0 to 20 keV. Also a total dose of the electron beam is preferably from 0 to 5 μC/cm$^2$, more preferably from 0 to 2 μC/cm$^2$, and particularly preferably from 0 to 1 μC/cm$^2$. At the irradiation with the electron beam, the substrate preferably has a temperature of from 0 to 450° C., more preferably from 0 to 400° C. and particularly preferably from 0 to 350° C. Also a pressure is preferably from 0 to 133 kPa, more preferably from 0 to 60 kPa, and particularly preferably from 0 to 20 kPa. Also for the purpose of preventing oxidation of the polymerized substance of the invention, an inert atmosphere such as Ar, He or nitrogen is preferably employed as the atmosphere around the substrate. Also a gas such as oxygen, a hydrocarbon or ammonia may be added for the purpose of causing a plasma, an electromagnetic wave or a reaction with chemical specifies by an interaction with the electron beam. The electron beam irradiation in the invention may be executed plural times, and the electron beam irradiation need not be executed in a same condition every time but may be executed in different conditions in different times.

An ultraviolet light may also be employed as the high energy ray. In case of utilizing an ultraviolet light, the irradiation is preferably executed within a wavelength region of from 190 to 400 nm, with an output of from 0.1 to 2,000 mWcm$^{-2}$ immediately above the substrate. At the ultraviolet irradiation, the substrate preferably has a temperature of from 250 to 450° C., more preferably from 250 to 400° C., and particularly preferably from 250 to 350° C. Also for the purpose of preventing oxidation of the polymerized substance of the invention, an inert atmosphere such as Ar, He or nitrogen is preferably employed as the atmosphere around the substrate. A pressure in such case is preferably from 0 to 133 kPa.

The curing may be executed by executing a heating treatment and a high-energy ray irradiation at the same time or in succession.

As to the film thickness, in case of forming an insulating film, a coated film can be formed with a thickness, in a dry state, of about from 0.05 to 1.5 μm by a coating once, and with a thickness of about from 0.1 to 3 μm by coatings twice.

In order that the cage structure is not decomposed at the calcining, the composition and the insulating film in the course of preparation are preferably substantially free from a group which executes a nucleophilic attack on Si atom (such as a hydroxyl group or a silanol group).

More specifically, an insulating film of a low dielectric constant can be formed by coating the composition of the invention for example by a spin coating on a substrate (normally a substrate bearing a metal wiring), then drying off the solvent by a preliminary heat treatment, and then executing a final heat treatment (annealing) at a temperature of from 300 to 430° C.

In case of utilizing a film, obtained by the film forming composition of the invention, as an interlayer insulating film for semiconductor, a wiring structure may include a barrier layer for preventing a metal migration on a lateral face of the wiring, or may include a capping layer or an interlayer adhesion layer for preventing a peeling at CMP or an etching stopper layer, on an upper face or a bottom face of the wiring or the interlayer insulating film, and the interlayer insulating film may be divided, if necessary into plural layers of different materials.

The insulating film of the invention may be constructed in a laminated structure with another Si-containing insulating film or an organic film. It is preferably laminated with a hydrocarbon-based film.

The film obtained by utilizing the film-forming composition of the invention may be subjected to an etching, for forming copper wiring or for other purposes. The etching may be conducted by wet etching or dry etching, but dry etching is preferred. For drying etching, ammonia-based plasma or fluorocarbon-based plasma may be employed suitably. For such plasma, there may be utilized not only Ar, but also other gases such as oxygen, nitrogen, hydrogen or helium. Also after etching, the film may be subjected to an ashing for the purpose of removing a photoresist or the like used in the process, and may be subjected to a rinsing for the purpose of removing residues at the ashing.

The film obtained utilizing the film-forming composition of the invention may be subjected, after the copper wiring process, to CMP (chemical-mechanical polishing) for planarizing the copper plated part. As the CMP slurry (chemical liquid), commercial slurries (for example manufactured by Fujimi Co., Rodel-Nitta Co., JSR Corp. and Hitachi Chemical Co.) are usable. Also commercially available CMP apparatus may be utilized (for example manufactured by Applied Materials Inc., or Ebara Corp.). Also a rinsing may be executed for removing residue of slurry after the CMP process.

The film obtained utilizing the film-forming composition of the invention may be utilized in various purposes. It is adapted for use as an insulating film in semiconductor devices such as an LSI, a system LSI, a DRAM, an SDRAM, an RDRAM and a D-RDRAM, and in an electronic components such as a multi-chip module and a multi-layered wiring board, also usable as an interlayer insulating film, an etching stopper film, a surface protective film, or a buffer coating film for a semiconductor, as a passivation film or an α-ray intercepting film for an LSI, a cover film or an overcoat film for a flexographic printing plate, a cover coating for a coppered flexible wiring board, a solder resist film, and a liquid crystal aligning film. It is also usable as a surface protective film, an antireflective film or a phase difference film for an optical apparatus.

This method allows to obtain an insulating film of a low dielectric constant, namely an insulating film having a specific inductivity of 2.7 or less, preferably 2.5 or less.

SYNTHESIS EXAMPLE 1

1 g of a mixture of a cage-structured silsesquioxane constituted of 8 $H_2C\!\!=\!\!CH\!\!-\!\!Si(O_{0.5})_3$ units, a cage-structured silsesquioxane constituted of 10 $H_2C\!\!=\!\!CH\!\!-\!\!Si(O_{0.5})_3$ units, and a cage-structured silsesquioxane constituted of 12 $H_2C\!\!=\!\!CH\!\!-\!\!Si(O_{0.5})_3$ units (type: OL1170, manufactured by Hybrid Plastics Co.), was added to 361 g of ethyl acetate. 95 μl of Luperox 11, manufactured by Arkema Yoshitomi Ltd., were added under a nitrogen flow, and the mixture was refluxed under heating for 5 hours. After cooling to the room temperature, the mixture was concentrated under a reduced pressure to a liquid weight of 2 g. Then 20 ml of methanol were added, and, after an agitation for 1 hour, a solid substance was collected by filtration and dried to obtain 0.83 g of a solid substance. A GPC analysis of the solid substance provided Mw=178,000 and Mn=37,000. In the solid substance, the unreacted starting material was contained by 1 mass % or less. The GPC was conducted utilizing Waters 2695 and Shodex GPC column KF-805L, at a column temperature of 40° C., and utilizing tetrahydrofuran as an eluting solvent at a flow rate of 1 ml/min, and 50 μl of a tetrahydrofuran solution with a sample concentration of 0.5 mass % were injected. A calibration line for the monomer was prepared utilizing an integrated value of an RI detecting apparatus (Waters 2414), for quantifying the monomer in the solid. Mn and Mw were calculated with a calibration line prepared with standard polystyrene.

A measurement of $^1$H-NMR of the solid substance, utilizing deuterized chloroform as measuring solvent, showed a proton peak derived from alkyl groups formed by polymerization of the vinyl groups and a proton peak derived from the remaining vinyl groups with an integrated ratio of 43:57, thus confirming the polymerization of vinyl groups with each other.

0.3 g of the composition, when added with 5 ml of cyclohexanone and agitated at 40° C. for 3 hours, were uniformly dissolved.

Also 5 μl of BYK 306 (manufactured by Byk Chemie) were added as a surfactant to obtain a composition (mix-1) of the invention. Based on the weight of the remaining monomer and the weight of the additive, it is evident that, within the solid component in the composition (mix-1), the polymerized substance formed by the reaction of vinyl groups with each other represents 60 mass % or more.

SYNTHESIS EXAMPLE 2

1.2 g of a cage-structured silsesquioxane constituted of 12 $H_2C\!\!=\!\!CH\!\!-\!\!Si(O_{0.5})_3$ units, obtained by purifying the starting material of Synthesis Example 1 (type: OL1170, manufactured by Hybrid Plastics Co.), were added to 3 g of ethyl acetate. 4 μl of Luperox 11, manufactured by Arkema Yoshitomi Ltd., were added under a nitrogen flow, and the mixture was refluxed under heating for 5 hours. After cooling to the room temperature and an insoluble matter being filtered off, the mixture was concentrated under a reduced pressure to a liquid weight of 2 g. Then 20 ml of methanol were added, and, after an agitation for 1 hour, a solid substance was collected by filtration and dried to obtain 0.32 g of a solid substance. A GPC analysis of the solid substance provided Mw=8,000 and Mn=3,000. In the solid substance, the unreacted starting material was contained by 1 mass % or less. The composition, when added with 5 ml of cyclohexanone and agitated at 40° C. for 3 hours, was uniformly dissolved. Also 5 µl of BYK 306 (manufactured by Byk Chemie) were added as a surfactant to obtain a composition (T12-1) of the invention.

Based on the weight of the remaining monomer and the weight of the additive, it is evident that, within the solid component in the composition, the polymerized substance formed by the reaction of vinyl groups with each other represents 60 mass % or more.

SYNTHESIS EXAMPLE 3

1 g of a cage-structured silsesquioxane constituted of 12 $H_2C=CH-Si(O_{0.5})_3$ units was added to 10 g of ethyl acetate. 10 µl of Luperox 11, manufactured by Arkema Yoshitomi Ltd., were added under a nitrogen flow, and the mixture was refluxed under heating for 5 hours. After cooling to the room temperature and an insoluble matter being filtered off, the mixture was concentrated under a reduced pressure to a liquid weight of 2 g. Then 20 ml of methanol were added, and, after an agitation for 1 hour, a solid substance was collected by filtration and dried to obtain 0.35 g of a solid substance. A GPC analysis of the solid substance provided Mw=26,000 and Mn=7,000. In the solid substance, the unreacted starting material was contained by 1 mass % or less. 0.3 g of the composition, when added with 5 ml of cyclohexanone and agitated at 40° C. for 3 hours, were uniformly dissolved. Also 5 µl of BYK 306 (manufactured by Byk Chemie) were added as a surfactant to obtain a composition (T12-2) of the invention.

Based on the weight of the remaining monomer and the weight of the additive, it is evident that, within the solid component in the composition, the polymerized substance formed by the reaction of vinyl groups with each other represents 60 mass % or more.

SYNTHESIS EXAMPLE 4

1 g of a cage-structured silsesquioxane constituted of 12 $H_2C=CH-Si(O_{0.5})_3$ units was added to 80 g of ethyl acetate. 35 µl of Luperox 11, manufactured by Arkema Yoshitomi Ltd., were added under a nitrogen flow, and the mixture was refluxed under heating for 5 hours. After cooling to the room temperature, the mixture was concentrated under a reduced pressure to a liquid weight of 2 g. Then 20 ml of methanol were added, and, after an agitation for 1 hour, a solid substance was collected by filtration and dried to obtain 0.41 g of a solid substance. A GPC analysis of the solid substance provided Mw=56,000 and Mn=12,000. In the solid substance, the unreacted starting material was contained by 1 mass % or less. 0.3 g of the composition, when added with 5 ml of cyclohexanone and agitated at 40° C. for 3 hours, were uniformly dissolved. Also 5 µl of BYK 306 (manufactured by Byk Chemie) were added as a surfactant to obtain a composition (T12-3) of the invention.

Based on the weight of the remaining monomer and the weight of the additive, it is evident that, within the solid component in the composition, the polymerized substance formed by the reaction of vinyl groups with each other represents 60 mass % or more.

SYNTHESIS EXAMPLE 5

3 g of a cage-structured silsesquioxane constituted of 12 $H_2C=CH-Si(O_{0.5})_3$ units was added to 2166 g of ethyl acetate. 570 µl of Luperox 11, manufactured by Arkema Yoshitomi Ltd., were added under a nitrogen flow, and the mixture was refluxed under heating for 5 hours. After cooling to the room temperature, the mixture was concentrated under a reduced pressure to obtain 3 g of a composition (T12-4a). In the solid substance, the unreacted starting material was contained by 3.4 mass %. A GPC analysis of the solid substance provided Mw=300,000 and Mn=20,000. In a calculation excluding the unreacted starting material from the solid substance, Mw=314,000 and Mn=29,000. 0.3 g of the composition, when added with 5 ml of cyclohexanone and agitated at 40° C. for 3 hours, were uniformly dissolved. Also 5 µl of BYK 306 (manufactured by Byk Chemie) were added as a surfactant to obtain a composition (T12-4) of the invention.

Based on the weight of the remaining monomer and the weight of the additive, it is evident that, within the solid substance in the composition, the polymerized substance formed by the reaction of vinyl groups with each other represents 60 mass % or more.

SYNTHESIS EXAMPLE 6

2 g of the composition (T12-4a) were dissolved in 10 ml of ethyl acetate, then dropwise added to 150 ml of methanol under agitation, and further agitated for 1 hour, and a solid substance was collected by filtration and dried to obtain 1.74 g of a composition (T12-5a). A GPC analysis provided Mw=328,000 and Mn=41,000. In the solid substance, the unreacted starting material was contained by 1 mass % or less. 0.3 g of the composition, when added with 5 ml of cyclohexanone and agitated at 40° C. for 3 hours, were uniformly dissolved. Also 5 µl of BYK 306 (manufactured by Byk Chemie) were added as a surfactant to obtain a composition (T12-5) of the invention.

Based on the weight of the remaining monomer and the weight of the additive, it is evident that, within the solid component in the composition, the polymerized substance formed by the reaction of vinyl groups with each other represents 60 mass % or more.

SYNTHESIS EXAMPLE 7

0.80 g of the composition (T12-5a) were dissolved in 4 ml of ethyl acetate, then dropwise added to 100 ml of methanol under agitation, and further agitated for 1 hour, and a solid substance was collected by filtration and dried to obtain 0.71 g of a solid substance. A GPC analysis of the solid substance provided Mw=343,000 and Mn=58,000. In the solid substance, the unreacted starting material was contained by 1 mass % or less. 0.3 g of the composition, when added with 5 ml of cyclohexanone and agitated at 40° C. for 3 hours, were uniformly dissolved. Also 5 µl of BYK 306 (manufactured by Byk Chemie) were added as a surfactant to obtain a composition (T12-6) of the invention.

SYNTHESIS EXAMPLE 8

1 g of an example compound (I-d) (manufactured by Aldrich Inc.) was added to 361 g of ethyl acetate. 100 µl of Luperox 11, manufactured by Arkema Yoshitomi Ltd., were added under a nitrogen flow, and the mixture was refluxed under heating for 5 hours. After adding 20 mg of 4-methoxyphenol as a polymerization inhibitor, and cooling to the room temperature, the mixture was concentrated under a reduced pressure to a liquid weight of 2 g. Then 20 ml of methanol were added, and, after an agitation for 1 hour, a solid substance was collected by filtration and dried to obtain 0.81 g of a solid substance. A GPC analysis of the solid substance provided Mw=158,000 and Mn=31,000. In the solid substance, the unreacted example compound (1-d) was contained by 1 mass % or less. 0.3 g of the composition, when added with 5 ml of cyclohexanone and agitated at 40° C. for 3 hours, were uniformly dissolved. Also 5 µl of BYK 306 (manufactured by Byk Chemie) were added as a surfactant to obtain a composition (d-1) of the invention.

SYNTHESIS EXAMPLE 9

1 g of the example compound (I-d), 0.1 g of dicumyl peroxide as a polymerization initiator and 100 g of 1,2-dichlorobenzene were agitated, under a nitrogen flow, at 140° C. for 30 minutes. The reaction liquid, after brought to the room temperature, was dropwise added to 500 ml of methanol under agitation, and after an agitation for 1 hour, a solid substance was collected by filtration and dried to obtain 0.51 g of a solid substance. A GPC analysis of the solid substance provided Mw=63,000 and Mn=12,000. In the solid substance, the unreacted example compound (1-d) was contained by 1 mass % or less. 0.3 g of the composition, when added with 5 ml of cyclohexanone and agitated at 40° C. for 3 hours, were uniformly dissolved. Also 0.1 mg of 4-methoxyphenol as a polymerization inhibitor and 5 µl of BYK 306 as surfactant were added to obtain a composition (d-2) of the invention.

SYNTHESIS EXAMPLE 10

1 g of the example compound (I-d) was added to 361 g of ethyl acetate, and refluxed under heating in a nitrogen flow. 2 µl portions of Luperox 11, manufactured by Arkema Yoshitomi Ltd., were added at an interval of 2 hours to add 6 µl in total, and the mixture was refluxed under heating further for 4 hours. After cooling to the room temperature, the mixture was concentrated under a reduced pressure to a liquid weight of 1.5 g. Then 20 ml of methanol were added, and, after an agitation for 1 hour, a solid substance was collected by filtration and dried to obtain 0.87 g of a solid substance. A GPC analysis of the solid substance provided Mw=178,000 and Mn=35,000. The solid substance was substantially free from a component having a molecular weight of 2,000,000 or higher. In the solid substance, the unreacted example compound (1-d) was contained by 1 mass % or less.

It was quantitatively determined from an H-spectrum of the solid substance that the vinyl groups contained in the example compound (I-d) remained in an amount of about 20 mol %, and that ethyl acetate in an amount of about 6 mass % was bonded to the solid substance. 0.3 g of the composition, when added with 5 ml of propylene glycol methyl ether acetate and agitated at 40° C. for 3 hours, were uniformly dissolved. Also 5 µl of BYK 306 (manufactured by Byk Chemie) were added as a surfactant to obtain a composition (d-3) of the invention.

SYNTHESIS EXAMPLE 11

1 g of the example compound (I-d) was added to 361 g of ethyl acetate, and refluxed under heating in a nitrogen flow. Lupazol 11, manufactured by Arkema Yoshitomi Ltd., was continuously added over 4 hours. The mixture was refluxed under heating further for 3 hours. After cooling to the room temperature, the mixture was concentrated under a reduced pressure to a liquid weight of 2.0 g. Then 20 ml of methanol were added, and, after an agitation for 1 hour, a solid substance was collected by filtration and dried to obtain 0.82 g of a solid substance. A GPC analysis of the solid substance provided Mw=188,000 and Mn=37,000. In the solid substance, the unreacted example compound (1-d) was contained by 1 mass % or less. The solid substance was substantially free from a component having a molecular weight of 2,000,000 or higher. It was quantitatively determined from an H-spectrum of the solid substance that the vinyl groups contained in the example compound (I-d) remained in an amount of about 25 mol %, and that ethyl acetate in an amount of 5 mass % was bonded to the solid substance. 0.3 g of the composition, when added with 5 ml of propylene glycol methyl ether acetate and agitated at 40° C. for 3 hours, were uniformly dissolved. Also 5 µl of BYK 306 (manufactured by Byk Chemie) were added as a surfactant to obtain a composition (d-4) of the invention.

SYNTHESIS EXAMPLE 12

1 g of the example compound (I-d) was added to 55 g of butyl acetate, and refluxed under heating in a nitrogen flow. 2 µl portions of Lupazol 11, manufactured by Arkema Yoshitomi Ltd., were added at an interval of 2 hours to add 8 µl in total, and the mixture was refluxed under heating further for 4 hours. After cooling to the room temperature, the mixture was concentrated under a reduced pressure to a liquid weight of 1.5 g. Then 20 ml of methanol were added, and, after an agitation for 1 hour, a solid substance was collected by filtration and dried to obtain 0.80 g of a solid substance. A GPC analysis of the solid substance provided Mw=208,000 and Mn=39,000. In the solid substance, the unreacted example compound (1-d) was contained by 1 mass % or less. The solid substance was substantially free from a component having a molecular weight of 2,000,000 or higher. It was quantitatively determined from an H-spectrum of the solid substance that the vinyl groups contained in the example compound (I-d) remained in an amount of about 50 mol %, and that butyl acetate in an amount of about 1 mass % was bonded to the solid substance.

0.3 g of the composition, when added with 5 ml of propylene glycol methyl ether acetate and agitated at 40° C. for 3 hours, were uniformly dissolved. Also 5 µl of BYK 306 (manufactured by Byk Chemie) were added as a surfactant to obtain a composition (d-5) of the invention.

SYNTHESIS EXAMPLE 13

1 g of the example compound (I-d) was added to 20 g of methyl isobutyl ketone, and refluxed under heating in a nitrogen flow. 20 µl of Lupazol 11, manufactured by Arkema Yoshitomi Ltd., were added, and the mixture was refluxed under heating further for 4 hours. After cooling to the room temperature, the mixture was concentrated under a reduced pressure to a liquid weight of 2.0 g. Then 20 ml of methanol were added, and, after an agitation for 1 hour, a solid substance was collected by filtration and dried to obtain 0.70 g of a solid substance. A GPC analysis of the solid substance provided Mw=255,800 and Mn=37,000. In the solid substance, the unreacted example compound (1-d) was contained by 1 mass % or less. The solid substance was substantially free from a component having a molecular weight of 3,000,000 or higher. 0.3 g of the composition, when added with 5 ml of propylene glycol methyl ether acetate and agitated at 40° C. for 3 hours, were uniformly dissolved. Also 5 µl of BYK 306 (manufactured by Byk Chemie) were added as a surfactant to obtain a composition (d-6) of the invention.

SYNTHESIS EXAMPLE 14

1 g of the example compound (I-d) was added to 70 g of methyl propionate, and refluxed under heating in a nitrogen flow. 30 μl of Lupazol 11, manufactured by Arkema Yoshitomi Ltd., were added, and the mixture was refluxed under heating further for 4 hours. After cooling to the room temperature, the mixture was concentrated under a reduced pressure to a liquid weight of 2.0 g. Then 20 ml of methanol were added, and, after an agitation for 1 hour, a solid substance was collected by filtration and dried to obtain 0.50 g of a solid substance. A GPC analysis of the solid substance provided Mw=80,000 and Mn=19,000. In the solid substance, the unreacted example compound (1-d) was contained in an amount of 2 mass %. The solid substance was substantially free from a component having a molecular weight of 1,000,000 or higher. It was quantitatively determined from an H-spectrum of the solid substance that the vinyl groups contained in the example compound (I-d) remained in an amount of about 30 mol %, and that methyl propionate in an amount of about 15 mass % was bonded to the solid substance.

0.3 g of the composition, when added with 5 ml of propylene glycol methyl ether acetate and agitated at 40° C. for 3 hours, were uniformly dissolved. Also 5 μl of BYK 306 (manufactured by Byk Chemie) were added as a surfactant to obtain a composition (d-7) of the invention.

SYNTHESIS EXAMPLE 15

In a 300-ml eggplant-shaped flask, 84.5 g of vinyltriethoxysilane and 145.2 g of propylene glycol monomethyl ether were charged, and 21.8 ml of a 0.4 mass % aqueous solution of nitric acid were added. The mixture was agitated at the room temperature for 5 hours to obtain a comparative composition A.

Each of the compositions (mix-1) to (d-2) and the comparative composition A, prepared in the foregoing synthesis examples, was filtered with a Teflon (registered trade name) filter having a pore size of 0.2 μm, then spin coated on a 4-inch silicon wafer, and the substrate was dried on a hot plate at 130° C. for 1 minute and then at 230° C. for 1 minute, and further baked in a clean oven containing a nitrogen atmosphere at 400° C. for 30 minutes to obtain a coated film.

The composition (d-2) was baked at 300° C. for 30 minutes, instead of bake at 400° C. for 30 minutes.

Also each of the compositions (d-3) to (d-7), prepared in the foregoing synthesis examples, was filtered with a Teflon (registered trade name) filter having a pore size of 0.05 μm, then spin coated on a 4-inch silicon wafer, and the substrate was dried on a hot plate at 100° C. for 1 minute and then at 200° C. for 1 minute, and further baked in a clean oven containing a nitrogen atmosphere at 400° C. for 40 minutes to obtain a coated film.

SYNTHESIS EXAMPLE 16

2.27 g of a compound (III-a), synthesized according to a method described in Angew. Chem. Int. Ed. Engl. 1997, 36, No. 7, 743-745, were added to a mixture of 14 ml of chlorodimethylvinylsilane and 30 ml of dimethylformamide (DMF), and were agitated at 60° C. for 2 hours. The mixture was separated by adding water and hexane, and the organic layer was washed twice with water, then dehydrated with anhydrous magnesium sulfate, then concentrated and purified by silica gel column chromatography to obtain 700 mg of a compound (I-g) of the invention.

$^1$H-NMR: δ 0.19(s, 72H); 5.75 (d, 12H); 5.92 (d, 12H); 6.12 (dd, 12H).

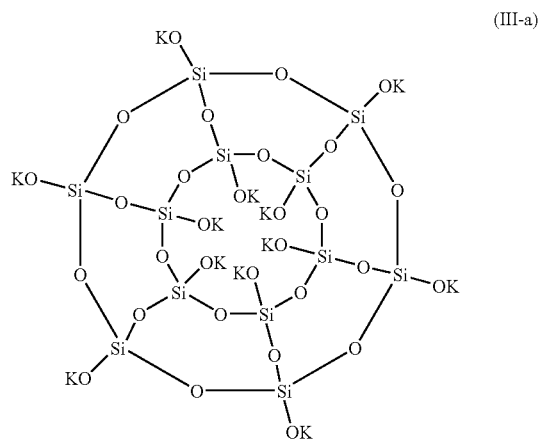

(III-a)

SYNTHESIS EXAMPLE 17

0.5 g of a cage-structured silsesquioxane constituted of 12 $H_2C=CH-Si(O_{0.5})_3$ units were dissolved in 0.5 ml of cycylohexanone, and heated at 200° C. for 20 hours. The obtained composition was dried and analyzed by GPC. It was found that, in the solid substance, monomer represented 38 mass % and the remainder had a molecular weight of dimer or larger. 1 ml of cyclohexanone was added to 0.2 g of the solid substance to obtain a composition (T12-7) of the invention.

GPC was conducted utilizing Waters 2695 and a Shodex GPC column, and a calibration line for the monomer was prepared with an integrated value of the RI detecting apparatus (Waters 2414), and used for quantifying the monomer in the solid substance. The molecular weight was calculated utilizing a calibration line, prepared with standard polystyrene.

SYNTHESIS EXAMPLE 18

1 g of the example compound (I-d), 100 ml of ethyl acetate and 40 μl of Lupazol 11 (polymerization initiator, manufactured by Arkema Yoshitomi Ltd.) were refluxed under heating for 5 hours. After the reaction solution was brought to the room temperature and concentrated, then 20 ml of methanol were added, and, after an agitation for 1 hour, 0.7 g of a solid substance were collected by filtration. A GPC analysis indicated that, in the solid substance, the example compound (I-d) was present by 9% and the remainder had a molecular weight of dimer or higher of the example compound (I-d). 0.4 g of the solid substance were dissolved in 3 ml of cyclohexanone to obtain a composition (d-8) of the invention.

SYNTHESIS EXAMPLE 19

1 g of a cage-structured silsesquioxane constituted of 12 $H_2C=CH-Si(O_{0.5})_3$ units was reacted in the same manner as in Synthesis Example 18 to obtain 0.6 g of a solid substance. A GPC analysis indicated that, in the solid substance, the monomer was present by 9% and the remainder had a molecular weight of dimer or higher. 0.4 g of the solid substance were dissolved in 3 ml of cyclohexanone to obtain a composition (T12-8) of the invention.

SYNTHESIS EXAMPLE 20

1 g of a mixture of a cage-structured silsesquioxane constituted of 8 $H_2C=CH-Si(O_{0.5})_3$ units, a cage-structured silsesquioxane constituted of 10 H₂C=CH—Si(O₀.₅)₃ units, and a cage-structured silsesquioxane constituted of 12 H₂C=CH—Si(O₀.₅)₃ units was reacted in the same manner as in Synthesis Example 18 to obtain 0.5 g of a solid substance. A GPC analysis indicated that, in the solid substance, the monomer was present by 8% and the remainder had a molecular weight of dimer or higher. 0.4 g of the solid substance were dissolved in 3 ml of cyclohexanone to obtain a composition (mix-2) of the invention.

Each of the compositions prepared in Synthesis Examples 17 to 20, was diluted with cyclohexanone if necessary so as to obtain a coated film thickness of 500 to 600 nm, and filtered with a Teflon (registered trade name) filter having a pore size of 0.2 μm to prepare a film forming composition. Such film forming composition was spin coated, so as to obtain a coated film thickness of 500 to 600 nm, on a 4-inch silicon wafer, then dried on a hot plate at 130° C. for 1 minute and then at 230° C. for 1 minute, and further baked in a clean oven containing a nitrogen atmosphere at 400° C. for 30 minutes to obtain a coated film.

The dielectric constant was measured with a mercury probe, manufactured by Four Dimensions Inc. (at a measuring temperature of 25° C.). The refractive index was measured with a spectral ellipsometer (VASE) manufactured by Uram Ltd. Also the Young's modulus was measured by Nanoindenter SA2 manufactured by MTS Inc.

Results of evaluations are shown in Tables 1 and 2.

TABLE 1

| Composition | Refractive index | Specific inductivity | Young's modulus (GPa) |
|---|---|---|---|
| mix-1 | 1.33 | 2.39 | 6.0 |
| T12-1 | 1.44 | 2.80 | 12.9 |
| T12-2 | 1.38 | 2.58 | 10.0 |
| T12-3 | 1.37 | 2.51 | 8.9 |
| T12-4 | 1.37 | 2.50 | 8.1 |
| T12-5 | 1.34 | 2.37 | 7.6 |
| T12-6 | 1.32 | 2.24 | 5.1 |
| d-1 | 1.34 | 2.40 | 7.5 |
| d-2 | 1.38 | 2.55 | 11.7 |
| d-3 | 1.33 | 2.38 | 6.0 |
| d-4 | 1.33 | 2.35 | 5.9 |
| d-5 | 1.34 | 2.41 | 10.9 |
| d-6 | 1.38 | 2.69 | 9.1 |
| d-7 | 1.38 | 2.60 | 8.2 |
| Comparative Composition A | 1.47 | 3.21 | 10.8 |

TABLE 2

| Composition | Specific inductivity |
|---|---|
| d-8 | 2.64 |
| T12-7 | 2.64 |
| T12-8 | 2.59 |
| mix-2 | 2.61 |

Results shown in Table 1 and 2 indicate that the composition of the present invention allows to form a layer with a low refractive index and a low dielectric constant.

The present invention allows to form a film, having a low density, a low refractive index, and excellent film properties such as dielectric constant and Young's modulus, and adapted for use as an interlayer insulating film in a semiconductor device or the like, or a low refractive index film in an optical device.

The entire disclosure of each and every foreign patent application from which the benefit of foreign priority has been claimed in the present application is incorporated herein by reference, as if fully set forth.

What is claimed is:

1. A composition comprising:
    a polymerized substance of a compound (I), wherein the compound (I) contains m numbers of RSi(O₀.₅)₃ units, wherein m represents an integer of from 8 to 16; and
    each R independently represents a non-hydrolysable group, provided that at least two among the R groups represent groups which contain a vinyl group or an ethynyl group, and
    wherein each one of the RSi(O₀.₅)₃ units is connected to another RSi(O₀.₅)₃ unit by sharing an oxygen atom with the RSi(O₀.₅)₃ unit, so as to form a cage structure, and
    a surfactant in an amount of from 0.01 to 1 mass % with respect to the entire amount of the composition,
    wherein within a solid component contained in the composition, a polymerized substance formed by a reaction of the compound (I) represents 60 mass % or more, and
    wherein the surfactant has a structure that includes the following chemical formula:

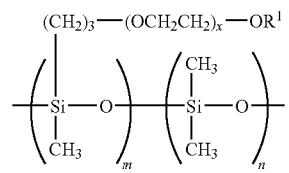

wherein $R^1$ represents a hydrogen atom or an alkyl group containing 1 to 5 carbon atoms;
x represents an integer of from 1 to 20; and m and n each independently represents an integer of from 2 to 100; in which each $R^1$ may be the same or different.

2. The composition according to claim 1, wherein a part of the solid component contained in the composition, remaining after elimination of the compound (I) on a GPC chart of the solid component, has a polystyrene- converted number-average molecular weight of from 3,000 to 300,000.

3. The composition according to claim 1, wherein a part of the solid component contained in the composition, remaining after elimination of the compound (I) on a GPC chart of the solid component, has a polystyrene-converted weight-average molecular weight of from 7,000 to 1,000,000.

4. The composition according to claim 1, which further comprises an organic solvent.

5. An insulating film forming composition comprising a composition according to claim 1.

6. A film producing method comprising:
    coating an insulating film forming composition according to claim 5 on a substrate; and
    curing the coated composition.

7. A film which is produced by a film producing method according to claim 6.

8. A semiconductor device comprising a film according to claim 7.

9. A film forming composition comprising:
    at least one of: compound (I) that contains m numbers of RSi(O₀.₅)₃ units, wherein m represents an integer of from 8 to 16; and each R independently represents a non-hydrolysable group, and wherein each one of the $RSi(O_{0.5})_3$ units is connected to another $RSi(O_{0.5})_3$ unit by sharing an oxygen atom with the $RSi(O_{0.5})_3$ unit, so as to form a cage structure; or a reaction product of the compound (I);

an organic solvent, and a surfactant in an amount of from 0.01 to 1 mass% with respect to the entire amount of the composition, wherein at least one among the groups represented by R is a group represented by formula (II):

$$(R^1)_3—Si—O— \quad (II)$$

wherein each $R^1$ independently represents a non-hydrolysable group, and at least two among the groups represented by $R^1$ within a molecule are groups containing a vinyl group.

10. The film forming composition according to claim 9, wherein at least two among the groups represented by R are groups containing a vinyl group.

11. A method for producing an insulating film, which comprises:

coating a film forming composition according to claim 9 on a substrate; and curing the coated composition.

12. An insulating film which is produced by utilizing a composition according to claim 9.

13. The film forming composition according to claim 9, wherein the surfactant has a structure that includes the following chemical formula:

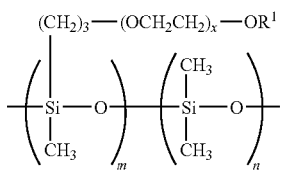

wherein $R^1$ represents a hydrogen atom or an alkyl group containing 1 to 5 carbon atoms;

x represents an integer of from 1 to 20; and m and n each independently represents an integer of from 2 to 100; in which each $R^1$ may be the same or different.

14. A film forming composition comprising:

at least one of: a compound (I) that contains m numbers of $RSi(O_{0.5})_3$ units, wherein m represents an integer of from 8 to 16; and each R independently represents a non-hydrolysable group, and wherein each one of the $RSi(O_{0.5})_3$ units is connected to another $RSi(O_{0.5})_3$ unit by sharing an oxygen atom with the $Rsi(O_{0.5})_3$ unit, so as to form a cage structure; or a reaction product of the compound (I);

an organic solvent, and a surfactant in an amount of from 0.01 to 1 mass% with respect to the entire amount of the composition, wherein the surfactant has a structure that includes the following chemical formula:

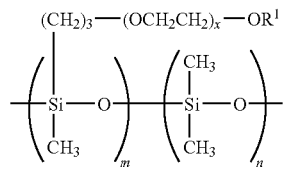

wherein $R^1$ represents a hydrogen atom or an alkyl group containing 1 to 5 carbon atoms;

x represents an integer of from 1 to 20; and m and n each independently represents an integer of from 2 to 100; in which each $R^1$ may be the same or different.

15. A method for producing an insulating film, which comprises:

coating a film forming composition according to claim 14 on a substrate; and curing the coated composition.

16. An insulating film which is produced by utilizing a composition according to claim 14.

* * * * *